(12) United States Patent
Kurtz et al.

(10) Patent No.: US 7,073,389 B2
(45) Date of Patent: Jul. 11, 2006

(54) SHUNT CALIBRATION FOR ELECTRONIC PRESSURE SWITCHES

(75) Inventors: Anthony D. Kurtz, Ridgewood, NJ (US); Wolf S. Landmann, Fair Lawn, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 70 days.

(21) Appl. No.: 10/677,986

(22) Filed: Oct. 2, 2003

(65) Prior Publication Data

US 2005/0072244 A1    Apr. 7, 2005

(51) Int. Cl.
*G01L 9/06* (2006.01)

(52) U.S. Cl. .................................................. 73/727

(58) Field of Classification Search ........... 73/715–727
See application file for complete search history.

(56) References Cited

U.S. PATENT DOCUMENTS

| | | | | |
|---|---|---|---|---|
| 3,702,076 A | * | 11/1972 | Georgi ........................ 374/169 |
| 4,023,066 A | * | 5/1977 | Smulders ................. 315/209 R |
| 4,138,709 A | * | 2/1979 | Colwill ........................ 361/180 |
| 4,233,848 A | * | 11/1980 | Sato et al. ...................... 73/727 |
| 4,667,516 A | * | 5/1987 | Schulz ........................... 73/727 |
| 4,966,034 A | * | 10/1990 | Bock et al. ..................... 73/727 |
| 5,253,532 A | * | 10/1993 | Kamens ......................... 73/727 |
| 5,614,678 A | | 3/1997 | Kurtz et al. ................... 73/727 |
| 5,686,826 A | | 11/1997 | Kurtz et al. ................. 323/365 |
| 6,529,847 B1 | * | 3/2003 | Hamilton et al. .............. 73/727 |
| 6,640,644 B1 | * | 11/2003 | Mireles et al. ................. 73/727 |

\* cited by examiner

*Primary Examiner*—Max Noori
(74) *Attorney, Agent, or Firm*—Plevy, Howard & Darcy PC

(57) ABSTRACT

An electronic switch of the type uses a piezoresistive Wheatstone bridge configuration to sense pressure. The output of the Wheatstone bridge is applied to an electronic control circuit which contains a comparator. The comparator monitors the output of the bridge and if the output voltage of the bridge exceeds a predetermined value, as indicated by the comparator, a switch is closed to illuminate a lamp indicating to the operator that the pressure has been exceeded. One terminal of a resistor is connected to an output of the bridge. The other terminal of the resistor is coupled to a switch which when operated, causes the resistor to be connected in parallel with one of the arms of the bridge, thereby producing an imbalance of the bridge. This imbalance, due to the shunting of the arm of the bridge by the resistor, causes the electronic control circuit to recognize an excessive pressure, whereby the electronics control circuit generates an output signal which causes the electronic switch to close, thereby illuminating the lamp.

13 Claims, 3 Drawing Sheets

SHUNT CALIBRATION FOR ELECTRONIC PRESSURE SWITCHES

FIELD OF INVENTION

This invention relates to electronic pressure switches and, more particularly, to an electronic pressure switch employing a piezoresistive bridge array and for providing shunt calibration for such a switch.

BACKGROUND OF THE INVENTION

As one can ascertain, a pressure switch is a device that closes or opens an electrical contact when the pressure is above or below a certain preset threshold. By connecting this switch to a lamp, or other indicator, the operator can immediately discern, in a coarse way, if the pressure or normal or not. Other typical uses of such switches are driving the coil of a relay, driving a logical input circuit and so on. Such pressure switches are utilized in many environments, such as in automobiles, airplanes, and for other purposes where a pressure indication is a desirable feature to monitor.

Although the information provided by a pressure switch does not have the accuracy of the pressure transducer, these switches accomplish an important reliability function. Very often, they are used in parallel with the transducer to provide valuable backup information in case of transducer or indicator failure. Such use is very common, for example, in aircraft systems, where the correct pressure is critical and the wrong pressure can cause an immediate flight abort in order to avoid a crash.

As indicated, the pressure switch gives an indication that a monitored pressure has exceeded a predetermined value, but does not really indicate what the pressure is. Assuming that the reading of the pressure indicator in a flight critical system shows zero pressure, by observing the status of the lamp connected to the switch and the indication of the other instrumentation in the system, the pilot can safely conclude that the pressure is probably correct, but either the transducer, the indicator, or the wiring failed. Conversely, if the lamp activated by the switch indicates a wrong pressure, the operator can look at the transducer indication and determine if the pressure is correct or not.

Numerous switches are simple electromechanical devices. Typically, they comprise a Bourdon tube connected to the pressure source, which activates a snap action microswitch. Although simple and relatively inexpensive, these mechanical switches have serious shortcomings. Some of the shortcomings are: poor accuracy of the trip point, poor control of the hysteresis, poor stability versus temperature, poor stability in time and otherwise, poor reliability, i.e. contact failures open or close. Due to these weaknesses, the mechanical switches are being replaced by electronic solid state devices. They are made using a piezoresistive bridge to sense the pressure, an electronic circuit to amplify the output of the sensor and a comparator with a pre-set threshold which drives a bipolar transistor or MOSFET, which is the actual switching element.

The characteristics of the electronic switches are significantly better than the mechanical counterparts. Especially important is their reliability and stability whereby many systems use only such switches instead of transducers. One feature missing from these electronic or mechanical switches is the ability to check if they are working or not before the pressure is turned on. Thus, as one can determine, before a flight, one must really determine whether or not the pressure switch is operating correctly. This is especially true in regard to aircraft operation, as wrong pressures can be extremely critical and cause accidents and fatalities.

It is therefore, an object of the present invention to provide an apparatus to determine whether a pressure switch is operating before a flight commences, in the case of an aircraft.

It is a general object of the present invention to check a pressure switch utilizing a shunt calibration technique to determine whether or not the pressure switch is operating properly.

SUMMARY OF INVENTION

An electronic switch of the type that employs a pressure sensitive bridge array for monitoring a pressure to activate an indicator when the monitored pressure exceeds a predetermined value indicative of a dangerous condition in combination therewith of a shunt calibration apparatus for enabling a user to test the switch prior to the application of the monitored pressure and comprises an impedance having one terminal connected to an output terminal of the bridge, switching means coupled to the other terminal of the impedance to enable the impedance to selectively shunt the bridge to force the bridge to provide an output indicative of the dangerous condition when the switching means is operated in a first state and to effectively isolate the impedance from the bridge when the switching means is operated in a second state.

DETAILED DESCRIPTION OF THE FIGURES

Figure 1:
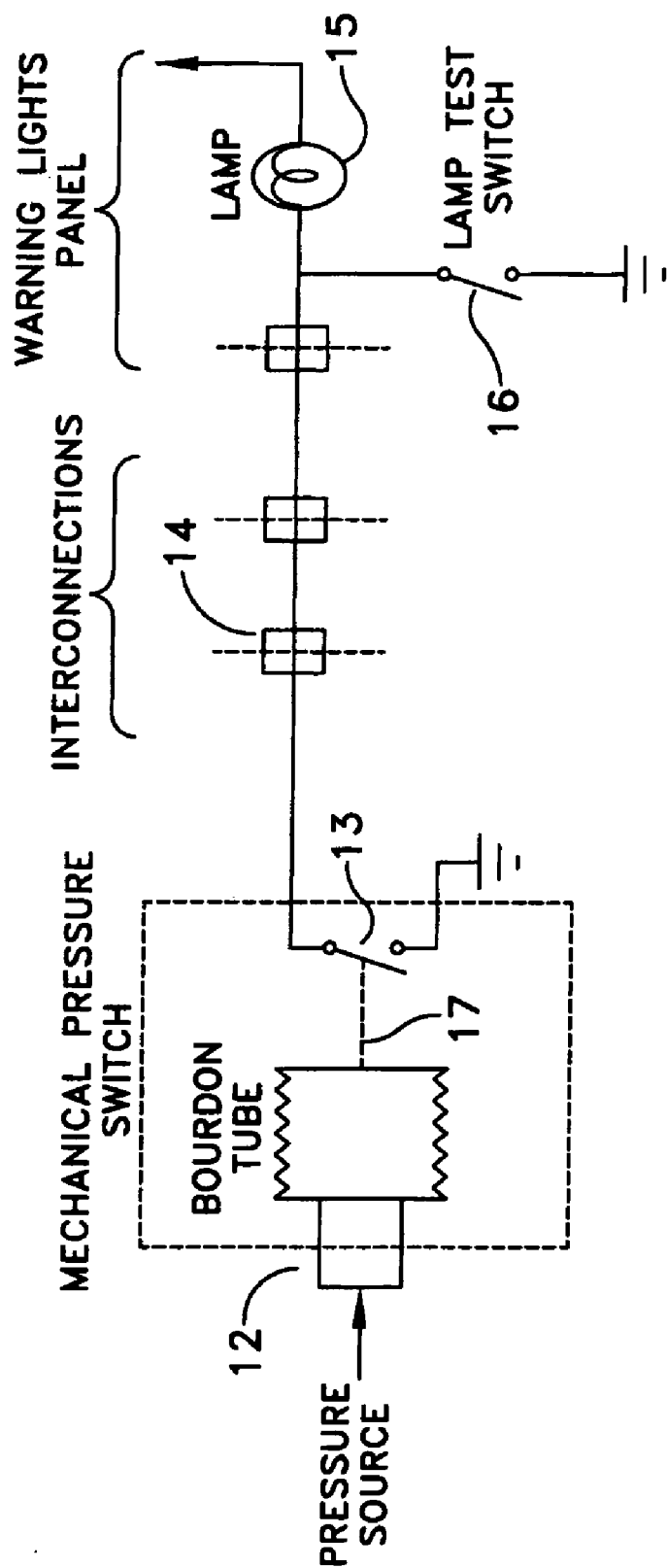
FIG. 1 is a schematic diagram of a prior art mechanical switch useful in explaining the operation of this invention.

Referring to FIG. 1, there is shown a typical prior art mechanical switch. Essentially, as one can see, a pressure source is applied to the pressure port of a Bourdon tube mechanical pressure switch 12. Bourdon tubes and Bourdon mechanical switches are well known in the art. A Bourdon type pressure gage is a widely used instrument in which pressure measurement is based on the deformation of an elastic measuring element. This element may be a curved tube, and its deformation is indicated by a pointer and a dial, which is calibrated to give pressure measurements.

The Bourdon tube has a coupling member 17 which is coupled to the actuator of a microswitch 13. Microswitches are well known. The microswitch has one terminal connected to ground and the other terminal connected to an input terminal of a lamp 15, which receives a biasing voltage at the other end. As one can understand, as soon as the member 17 operates to close the microswitch, the lamp is lit, indicating that there is an excessive pressure or a deficiency of pressure, without specifying the magnitude of the pressure. The terminal 14 can be coupled to another switch, relay or device to inactivate or control the monitored pressure source.

In FIG. 1, the prior art problem is also noted. As one can see, the lamp test switch 16, when closed to operate enables the lamp 15 to energize. If the lamp comes on, then one indicates that the lamp is functioning, but there is no indication whatsoever that the pressure switch is functioning, or that the switch 13 is functioning. Thus, as one can see from FIG. 1, the mechanical switch circuit depicted does not provide the ability to check operation before the pressure is turned on, as before a flight. The only thing that the operator or pilot can determine is that the lamp 15 is operable and he has no knowledge as to whether the switch is functioning. It is, of course, understood that apart from the Bourdon type pressure gages, there are many other pressure gages which are utilized in the prior art, as mechanical type devices.

Figure 2:
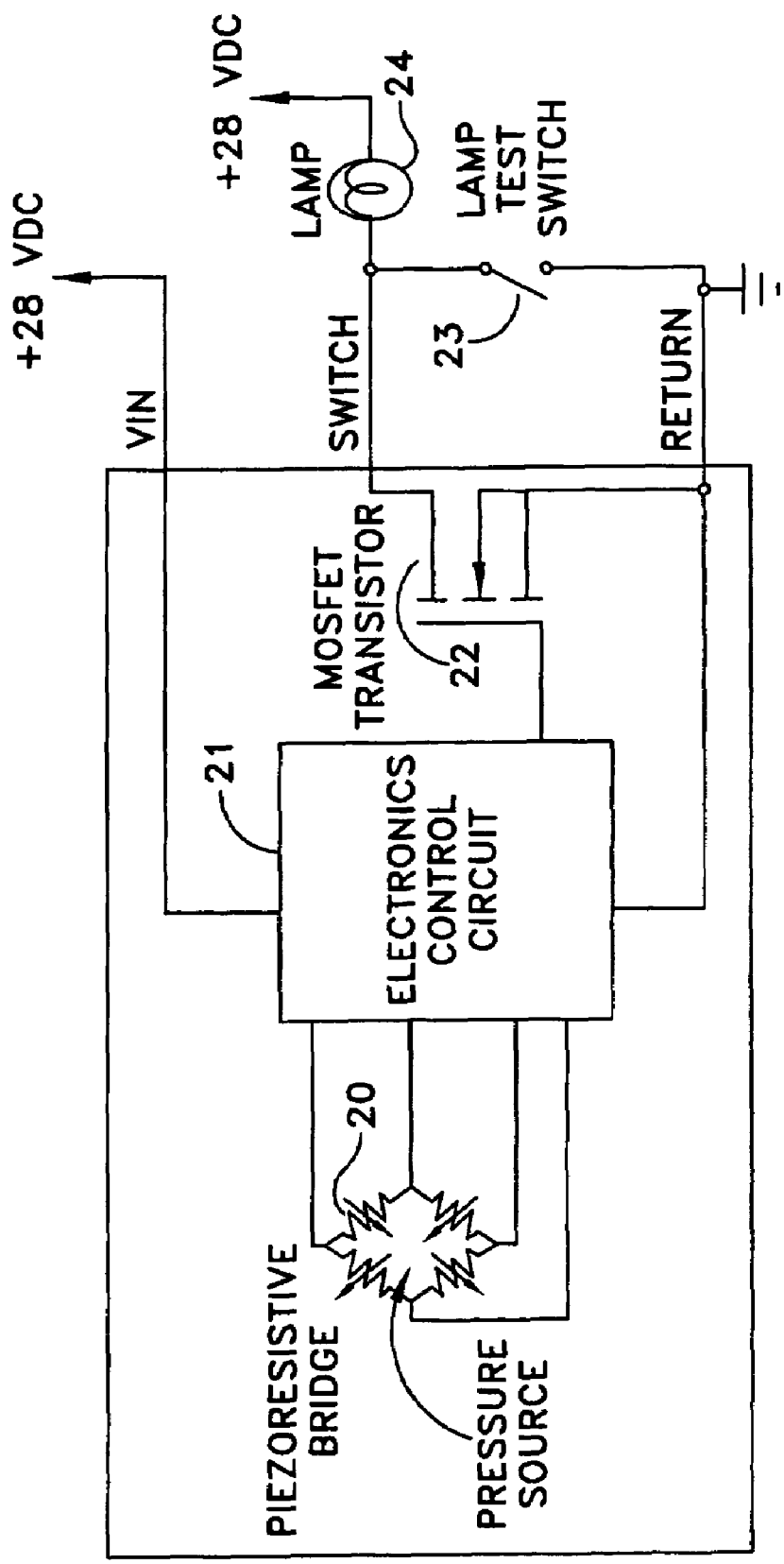
FIG. 2 is a schematic diagram of a prior art electronic switch utilizing a piezoresistive bridge useful in explaining the operation of this invention.

Referring to FIG. 2, there is shown a prior art electronic switch. As one can ascertain from FIG. 2, the electronic switch, as indicated, utilizes a piezoresistive bridge 20. Piezoresistive transducers are well known in the art and the assignee herein is one of the leading manufacturers of these transducers. Basically, a piezoresistor transducer utilizes a piezoresistive bridge in a Wheatstone Bridge configuration. The piezoresistive devices respond directly to an applied pressure to vary their resistance accordingly. Hence, the output voltage of the bridge changes according to the applied pressure. In this manner, an electronic control circuit 21 monitors the output of the bridge and, for example, apply the amplified output of the bridge to a comparator circuit. One input of the comparator is responsive to the output of the bridge, while the other input of the comparator is coupled to a predetermined reference potential indicative of a pressure which, if exceeded, would create a hazardous condition. This signal enables an output lead of the control circuit 21, which is connected to the gate electrode of a MOSFET transistor 22 to receive a signal which would switch the MOSFET on and hence, cause lamp 24 to illuminate indicative of this detected pressure condition.

As one can see, the prior art also utilizes a lamp test switch 23, which again, functions as switch 16 of FIG. 1. One can also ascertain from FIG. 2, that in the event of a failure of the Wheatstone Bridge 20, or in the event of the failure of the electronics control circuit 22, there would be no indication available. Hence, when the lamp test switch 23 is energized, the lamp would light if the filament of the lamp was intact. If the lamp was defective, the lamp would not illuminate and therefore, the operator would be notified that there is something wrong with the lamp. The circuit of FIG. 2 would not give any indication to the operator if there was anything wrong with the circuit in general. Therefore, as indicated above, the feature missing from electronic or mechanical switches is the ability to check if they are working or not before the pressure is turned on, as during an actual flight.

Figure 3:
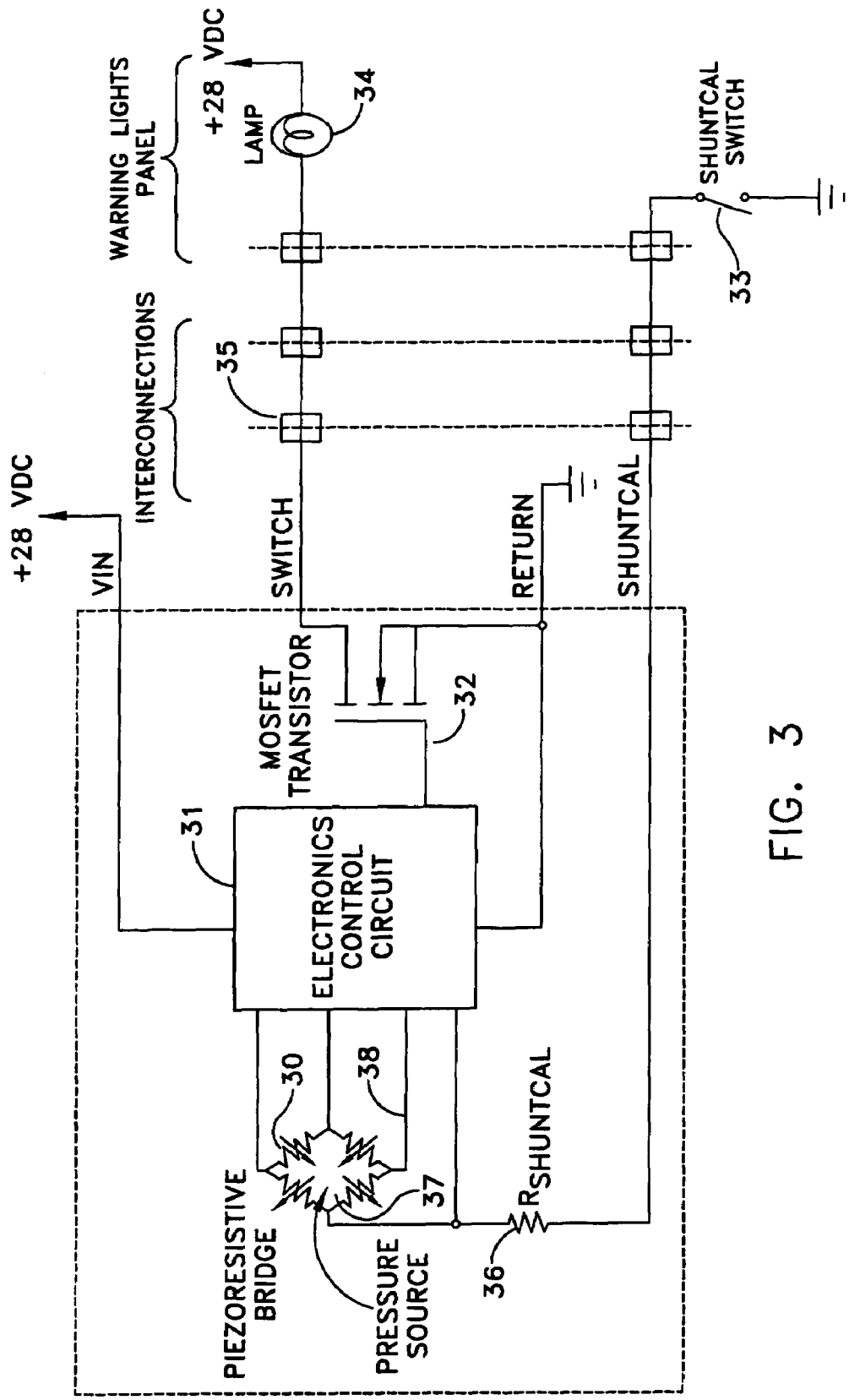
FIG. 3 is a schematic diagram showing a pressure switch with shunt calibration according to this invention.

Referring to FIG. 3, there is shown a circuit which utilizes an electronic switch (as that of FIG. 2), whereby the circuit makes a further determination that the switch is operating and that a critical pressure can be detected. Essentially, as seen from FIG. 3, the circuit configuration is consistent with that shown in FIG. 2. For example, the bridge 30 of FIG. 3 is a piezoresistive Wheatstone Bridge, as is the bridge 20. It receives a pressure from a pressure source, which a pressure source is applied to an input port of the pressure transducer, wherein it impinges upon a diaphragm containing the piezoresistor bridge.

As indicated, such circuit configurations are very well known. For example, see U.S. Pat. No. 5,686,826 entitled, "Ambient Temperature Compensation for Semiconductor Transducer Structures" by A. D. Kurtz and Wolf S. Landmann, the inventors herein, and assigned to Kulite Semiconductor Products, Inc. The patent issued on Nov. 11, 1997. See also U.S. Pat. No. 5,614,678 entitled, "High Pressure Piezoresistive Transducer" issued on Mar. 25, 1997. That patent describes a high pressure piezoresistive transducer, plus it cites many other patents which are assigned to Kulite Semiconductor Products, Inc. and which are indicative of the operation and use of piezoresistive sensors.

As seen in FIG. 3, and as in FIG. 2, the output of the bridge 30 is connected to inputs of electronic control circuit 31, which again is a comparator which compares the voltage generated by the bridge with a predetermined voltage to activate the MOSFET transistor 32 by applying a proper signal to the gate. The transistor 32 acts as a switch and hence, will illuminate light 34 if the output of the comparator is activated indicating that a monitored pressure has been exceeded. Thus, as one can readily ascertain, the circuits of FIG. 2 and FIG. 3 are relatively similar with the following addition. Shown in FIG. 3, there is a resistor 36 having one terminal connected to the piezoresistive bridge and the other terminal directed toward reference potential through a shunt calibration switch 33. The circuit operates as follows. For purposes of this example and to indicate the function of the shunt calibration resistor 36 and switch 33, the example describes the case of a pressure switch intended to indicate if the pressure in a fuel supply line is above or below 30 psia. When the pressure is below 30 psia, the switch indicative of MOS 32 is open. Any pressure above 30 psia closes the switch because MOSFET 32 will be activated by control circuit 31.

During normal operation, as one can ascertain, resistor 36 does not interfere with the operation of the bridge. When switch 33 is closed, resistor 36 is connected in parallel with one of the arms of the bridge, for example, bridge resistor 37. The lower junctions of the bridge, indicated by reference numeral 38, is at reference potential and hence, resistor 36 can be used to shunt resistor 37 or any other resistor in the bridge. This produces an additional imbalance of the bridge 30. The value of resistor 36 is chosen such that the imbalance is equivalent to an additional pressure of about 30 psia. The switch 33 can be a conventional mechanical switch or an electronic switch, as one can easily ascertain. The electronic switch can now be tested as follows. When the aircraft is on the ground, with the fuel pump not yet activated, the pressure is normal atmospheric pressure 14.7 psia. Under these conditions, the switch must be open. By shorting or closing the switch 33, the switch will behave as if connected to a pressure source of 14.7 psia, plus 30 psia (44.7 psia). Now the switch must be closed. Both states of the switch, open and closed, can easily be observed by the operator without activating the pressure source. This test will verify that the bridge and entire electronic circuit operate properly.

This shunt calibration feature accomplishes another function besides checking the functionality of the switch 33. It also checks if the indicator lamp 34 is burned out, or if the wiring is damaged. If switch 33 is closed, then all connections from the piezoresistive bridge 30 to the lamp must be operating. As indicated, the prior art had lamp test switches 16 and 23, FIGS. 1 and 2, which turns all the lamps on. Based on that test, the pilot can conclude that the lamps are working. Unfortunately, the prior art traditional test will give a false sense of the integrity of the entire system. Therefore, as one can ascertain, if there is a system failure in the prior art, the lamp will still go on when the test switch is activated. In FIG. 3 this will not occur, as if the bridge is not operating and one shunts an inoperative bridge, then the correct signal will not be sent to the switch transistor 32 and the lamp 34 will not illuminate, indicating that there could be a failure in the bridge, the switch 32 or in the electronic control circuit 31. Also shown at the output of FIG. 3 are interconnections

35, which take the output from the MOSFET transistor 32, which goes to ground when the transistor comes on and uses such contacts to enable or disable other units associated with the pressure being monitored. For example, terminal 35 can be coupled to a relay or other devices which can sound an alarm if the desired pressure is exceeded.

Thus, as seen above, using the shunt calibration feature described in FIG. 3, the integrity of the entire system is verified prior to the flight. This includes the switch, the wiring, the connectors and the lamp.

It is, of course, obvious that one skilled in the art can envision other alternatives and embodiments which are deemed to be part and parcel of the invention as described herein.

What is claimed is:

1. In a pressure monitoring system of the type employing a pressure sensitive bridge for activating an indicator by activating a switch when the monitored pressure exceeds a predetermined value indicative of a dangerous condition, in combination therewith, a shunt calibration apparatus for enabling a user to test said switch and indicator prior to the application of said monitored pressure, said shunt calibration apparatus comprising: an impedance having one terminal connected to an output terminal of said bridge, and switching means coupled to terminal of said impedance to selectively shunt said bridge to provide an output indicative of said dangerous condition when said switching means is operated in a first state and to effectively isolate said impedance from said bridge when said switching means is operated in a second state.

2. The pressure monitoring system according to claim 1 wherein said pressure sensitive bridge is a Wheatstone bridge.

3. The pressure monitoring system according to claim 1 wherein said Wheatstone Bridge includes at least one piezoresistor.

4. The pressure monitoring system according to claim 1 wherein said impedance comprises a resistor.

5. The pressure monitoring system according to claim 1 wherein said indicator is a lamp.

6. An electronic switch apparatus, comprising:
a bridge circuit responsive to applied pressure to provide at an output a voltage proportional to applied pressures,
a control circuit coupled to said bridge for receiving said output voltage and for providing an indication when said voltage exceeds a predetermined value indicative of an improper pressure,
switching means responsive to said provided indication to operate an indicator capable of notifying a user of said improper pressures,
an impedance having a first terminal coupled to an output of said bridge and a second terminal, and
a selectively operated switch having one terminal coupled to said second terminal of said impedance with said other terminal coupled to a reference potential, said switch being operative in a first position to cause said impedance to shunt said bridge to cause said bridge to provide a voltage indicative of said improper pressure during the absence of an applied pressure to said bridge and operative in a second position to isolate said impedance from said bridge whereby a user can determine whether said switching means and indicator will be operative upon application of the applied pressure.

7. The electronic switch apparatus according to 6 wherein said bridge is a piezoresistive bridge.

8. The electronic switch apparatus according to claim 6 wherein said impedance comprises a resistor of a magnitude to cause said bridge to provide a voltage indicative of said improper pressure.

9. The electronic switch apparatus according to claim 6 wherein said switching means includes a transistor having a control electrode coupled to said control circuit and responsive to said provided indication to turn on said transistor having first and second output electrode with one output electrode coupled to a reference potential.

10. The electronic switch apparatus according to claim 9 wherein said indicator is a lamp having one terminal coupled to said other output electrode of said transistor and said other lamp terminal coupled to a source of operating potential.

11. The electronic switch apparatus according to claim 10 wherein said transistor is a MOSFET or a bipolar transistor.

12. The electronic switch apparatus according to claim 7 wherein said bridge is a piezoresistive Wheatstone bridge.

13. A monitoring system comprising:
a resistive bridge for providing an output indicative of a sensed condition:
an indicator being electrically coupled to said bridge and for providing an indication when the sensed condition satisfies a threshold condition; and,
a switch for selectively shunting an electrical impedance into said bridge:
wherein, said impedance is of a magnitude to cause said bridge output to be indicative of the sensed condition satisfying the threshold condition, regardless of said sensed condition, when shunted into said bridge by said switch, and wherein said threshold condition corresponds to a threshold pressure value.

\* \* \* \* \*